3,493,584
4-SUBSTITUTED AMINO-5-SULFAMOYLBENZOIC ACID DERIVATIVES AND PREPARATION
Joseph Weinstock, Phoenixville, and Nelson C. F. Yim, Philadelphia, Pa., assignors to Smith Kline & French Laboratories, Philadelphia, Pa., a corporation of Pennsylvania
No Drawing. Filed Feb. 21, 1966, Ser. No. 528,769
Int. Cl. C07d 5/00, 7/00; C07c 143/78
U.S. Cl. 260—327                                                 4 Claims

ABSTRACT OF THE DISCLOSURE 4-substituted amino-5-sulfamoylbenzoic acid derivatives are prepared by converting a 4-halo-5-sulfamoylbenzoic acid ester to the corresponding benzamide, dehydrating the benzamide, reacting the resulting benzonitrile with a substituted amine and reacting the resulting 4-substituted amino-5-sulfamoylbenzonitrile with aqueous sodium hydroxide solution or by reacting a 4-halo-5-sulfamoylbenzoic acid or ester with a substituted amine. These compounds have diuretic activity and are useful in treating hypertension.

---

This invention relates to new 4-substituted amino-5-sulfamoylbenzoic acid derivatives which have diuretic activity and are also useful in treating hypertension and to a process and benzonitrile intermediates for preparing said compounds.

The new 4-substituted amino-5-sulfamoylbenzoic acid derivatives of this invention are represented by the following formula:

FORMULA I

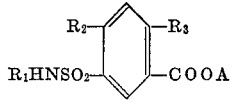

in which:
A is hydrogen, lower alkyl or lower alkoxy-lower alkylene;
$R_1$ is hydrogen, lower alkyl or lower alkoxy;
$R_2$ is furylmethylamino, thienylamino, benzylamino, dibenzylamino, cycloalkylmethylamino, cycloalkenylmethylamino, norbornenylmethylamino, 3,4-dihydro-2H-pyranylmethylamino, tetrahydrofurylmethylamino, tetrahydrothienylmethylamino, tetrahydropyranylmethylaminio, tetrahydrothiapyranylmethylamino or lower alkoxy-lower alkyleneamino and
$R_3$ is chloro, bromo, fluoro or trifluoromethyl or, when A is hydrogen, a carboxylic acid salt thereof.

Preferred compounds of Formula I are represented by the following formula:

FORMULA II

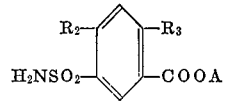

in which:
A is hydrogen or methyl;

$R_2$ is furylmethylamino or 2-tetrahydropyranylmethyl and
$R_3$ is chloro or trifluoromethyl.

The terms "lower alkyl," "lower alkoxy" and "lower alkylene" where used herein denote groups having 1 to 6, preferably 1 to 4, carbon atoms.

When $R_2$ is benzylamino or dibenzylamino said benzyl rings may be substituted by substituents such as halogen, lower alkyl, lower alkoxy, trifluoromethyl, etc.

Also, included in this invention are pharamaceutically acceptable, carboxylic acid salts of the 4-substituted amino-5-sulfamoylbenzoic acid derivatives of Formula I prepared by reacting the carboxylic acid with an inorganic or organic base such as an alkali metal hydroxide, for example, sodium or potassium hydroxide, ammonia or benylamine.

Compounds of this invention are prepared by the following procedure which is also an object of this invention:

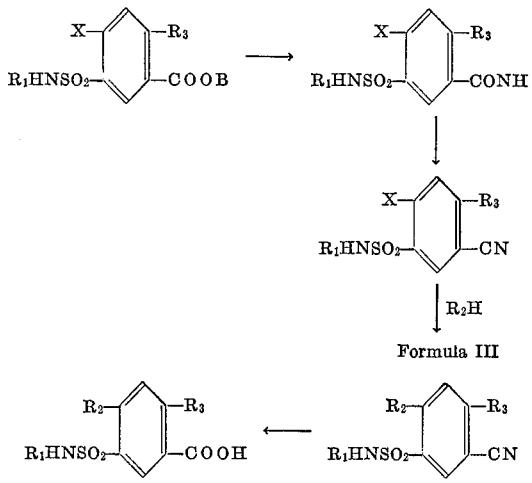

Formula III

The terms $R_1$ and $R_2$ are as defined above, $R_3$ is chloro, bromo or fluoro, B is lower alkyl and X is chloro, bromo or fluoro chosen so that when $R_3$ is chloro, X is chloro or fluoro; when $R_3$ is bromo, X is chloro, bromo or fluoro and when $R_3$ is fluoro, X is fluoro.

The benzonitrile intermediates of Formula III above are also objects of this invention.

According to the above procedure a 2-substituted-4-halo-5-sulfamoylbenzoic acid ester is converted to the corresponding benzamide by treating with concentrated ammonium hydroxide. The reaction is conveniently carried out in an excess of concentrated ammonium hydroxide at about room temperature. The benzamide is dehydrated, for example using thionyl chloride in a solvent such as dimethoxyethane at elevated temperature, conveniently at reflux temperature, to give the corresponding benzonitrile.

The benzonitrile is reacted with $R_2H$, in which $R_2$ is as defined above. The reaction is preferably carried out at elevated temperature in a suitable solvent such as methoxyethanol or the dimethyl ether of diethylene glycol. An excess of the amine is used. A suitable less reactive organic base such as triethylamine may be employed in the reaction as an acid acceptor.

Alternatively, compounds of Formula I are prepared by the following procedure:

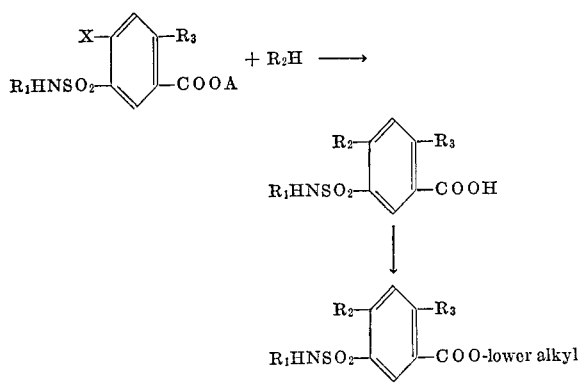

The terms A, X, $R_1$, $R_2$ and $R_3$ are as defined above.

According to the above procedure a 2-$R_3$-4-halo-5-sulfamoylbenzoic acid or a lower alkyl ester thereof is reacted with an amine, $R_2H$. The reaction is carried out at elevated temperature in a suitable solvent such as methoxy-ethanol or the dimethyl ether of diethylene glycol. A suitable less reactive organic base such as triethylamine may be used as an acid acceptor. The reaction mixture is diluted with ether and water. The organic layer is washed with hydrochloric acid, then extracted with aqueous potassium hydroxide solution. The extracts are allowed to stand at room temperature for about 36 to 48 hours. Ethyl acetate is added and the resulting mixture is acidified to about pH 3 to 4 with acetic acid. The organic layer is extracted with aqueous sodium bicarbonate solution. The aqueous extracts are acidified to about pH 5 to 5.5 with acetic acid and then filtered. The filtrate is further acidified to about pH 1 to 4. Cooling and filtering gives the benzoic acids of Formula I. Conversion of the benzoic acid to the acid chloride with thionyl chloride in chloroform and subsequent alcoholysis of the acid chloride with a lower alkanol gives the lower alkyl esters of Formula I.

The 2-$R_3$-4-halo-5-sulfamoylbenzoic acid ester starting materials for the above procedures are either known to the art or are prepared by procedures I or II as follows:

I.

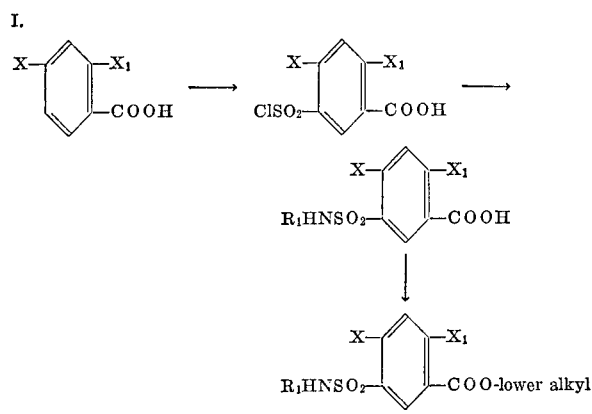

The term $R_1$ is as defined above; X and $X_1$ are chloro, bromo or fluoro chosen so that when $X_1$ is chloro, X is chloro or fluoro; when $X_1$ is bromo, X is chloro, bromo or fluoro and when $X_1$ is fluoro, X is fluoro.

According to procedure I, a 2,4-dihalobenzoic acid is heated with an excess of chlorosulfonic acid and the resulting 5-chlorosulfonyl compound is treated with ammonium hydroxide or with an alkylamine to give a 2,4-dihalo-5-sulfamoylbenzoic acid. The lower alkyl ester is prepared by heating the benzoic acid with an excess of a lower alkanol in the presence of a mineral acid such as sulfuric acid.

II.

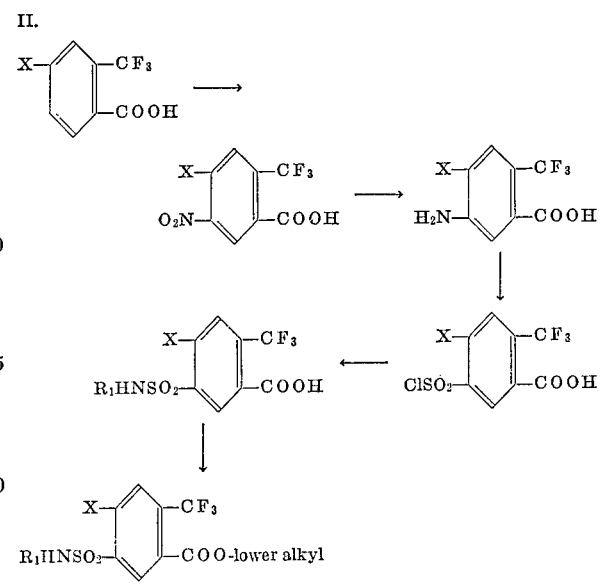

The term $R_1$ is as defined above and X is chloro, bromo or fluoro.

According to procedure II a 4-halo-2-trifluoromethylbenzoic acid is treated with fuming sulfuric acid and fuming nitric acid to give a 4-halo-5-nitro-2-trifluoromethylbenzoic acid. The nitro group is reduced by treating with a chemical reducing agent such as iron powder in aqueous ammonium chloride solution to give a 5-amino-4-halo-2-trifluoromethylbenzoic acid. Treating this amino compound with concentrated hydrochloric acid and sodium nitrite followed by a solution of sulfur dioxide in acetic acid containing cuprous or cupric chloride and treating the resulting 5-chlorosulfonyl compound with ammonium hydroxide or with an alkylamine gives a 4-halo-5-sulfamoyl-2-trifluoromethylbenzoic acid. Esterifying the benzoic acid by heating with an excess of a lower alkanol in the presence of a mineral acid such as sulfuric acid gives the lower alkyl ester.

The following examples are not limiting but are illustrative of the compounds of this invention.

EXAMPLE 1

The methyl ester of 2,4-dichloro-5-sulfamoylbenzoic acid (77 g.) and 1400 ml. of concentrated ammonium hydroxide are stirred for about 45 minutes. The resulting solution is allowed to stand at room temperature for two days, then concentrated, chilled and filtered to give 2,4-dichloro-5-sulfamoylbenzamide.

To 4 g. of the above prepared benzamide suspended in 50 ml. of dimethoxyethane is added 15 ml. of thionyl chloride. The mixture is refluxed for five hours with stirring and then it is evaporated to dryness. The residue is crystallized with toluene-hexane. The white precipitate is collected by filtration and recrystallized from toluene to give 2,4-dichloro-5-sulfamoylbenzonitrile.

To 2 g. of 2,4-dichloro-5-sulfamoylbenzonitrile in 6.5 ml. of the dimethyl ether of diethylene glycol is added 1 g. of 2-tetrahydropyranylmethylamine and 6.5 ml. of triethylamine. The mixture is refluxed for three hours. The mixture is then cooled, diluted with a mixture of 25 ml. of ether and 25 ml. water and then acidified. The ether layer is washed with saturated sodium chloride solution. The ether is then evaporated. The residue is crystallized with toluene and aqueous methanol to give 2-chloro-4-(2-tetrahydropyranylmethylamino)-5-sulfamoylbenzonitrile.

A mixture of 100 mg. of 2-chloro-4-(2-tetrahydropyranylmethylamino)-5-sulfamoylbenzonitrile and 2 ml. of 10% sodium hydroxide solution is heated on a steam bath for two hours. It is then acidified with hydrochloric acid to pH 2 and the precipitate is collected by filtration to give 2-chloro-4-(2-tetrahydropyranylmethylamino)-5-sulfamoylbenzoic acid.

EXAMPLE 2

A mixture of 115 g. of 2,4-dichloro-5-sulfamoylbenzoic acid, 124 g. of furfurylamine and 320 ml. of the dimethyl ether of diethylene glycol is heated at reflux for six hours, then stirred at room temperature overnight. The resulting mixture is poured into 1500 ml. of 1 N hydrochloric acid and extracted with ether. The ether solution is extracted with dilute sodium bicarbonate solution. The extract is treated with charcoal, filtered and acidified to pH 5.5 with acetic acid. The mixture is stirred for one hour and filtered. The filtrate is taken to pH 3 with acetic acid, the resulting solid material is filtered off and recrystallized from aqueous ethanol to give 2-chloro-4-furfurylamino-5-sulfamoylbenzoic acid.

EXAMPLE 3

To 5 g. 2,4-dichloro-5-sulfamoylbenzonitrile (prepared as in Example 1) in 16.5 ml. the dimethyl ether of diethylene glycol is added 16.5 ml. of triethylamine and 2.5 g. of the 2-aminomethyl-3,4-dihydro-2H-pyran. The mixture is refluxed for three hours, then allowed to stand at room temperature overnight.

The mixture is diluted with 100 ml. of water and 100 ml. ether. The mixture is acidified to pH 1 with cold hydrochloric acid, then shaken. The organic layer is washed with water, then dried over magnesium sulfate for three hours.

The drying agent and solvent are removed and the residue is washed with hexane and crystallized with ether. The crystalline material is collected by filtration and recrystallized with ether-petroleum ether and with chloroform-hexane to give 2-chloro-4-[2-(3,4-dihydro-2H-pyranyl)methylamino]-5-sulfamoylbenzonitrile.

By the procedure of Example 1, a mixture of 2-chloro-4 - [2 - 3,4 - dihydro - 2H - pyranyl)methylamino] - 5-sulfamoylbenzonitrile and 10% sodium hydroxide solution is heated on a steam bath for two hours, then acidified to pH 2 and filtered to give 2-chloro-4-[2-(3,4-dihydro-2H-pyranyl)methylamino]-5-sulfamoylbenzoic acid.

EXAMPLE 4

To 5 g. of 2,4-dichloro-5-sulfamoylbenzonitrile (prepared as in Example 1) is dissolved in 16.5 ml. of the dimethyl ether of diethylene glycol is added 3.12 g. 3-chlorobenzylamine and 16.5 ml. of triethylamine. The mixture is refluxed for three hours, then cooled and diluted with 100 ml. of water and 100 ml. of ether. The resulting mixture is acidified with hydrochloric acid. The ether layer is dried over magnesium sulfate for three hours. The drying agent and the solvent are removed and the residue is washed with hexane. Toluene is added and the solid material is filtered off and recrystallized from aqueous methanol to give 2-chloro-4-(3-chlorobenzylamino)-5-sulfamoylbenzonitrile.

A mixture of 150 mg. of 2-chloro-4-(3-chlorobenzylamino)-5-sulfamoylbenzonitrile and 2 ml. of 10% sodium hydroxide solution is heated on a steam bath for 3.5 hours. The mixture is then chilled, slowly acidified to pH 1 with dilute hydrochloric acid, then allowed to stand for about 90 minutes and filtered to give 2-chloro-4-(3-chlorobenzylamino)-5-sulfamoylbenzoic acid.

EXAMPLE 5

To 5 g. of 2,4-dichloro-5-sulfamoylbenzoic acid (prepared as in Example 1) in 16.5 ml. of the dimethyl ether of diethylene glycol is added 2.0 g. of the 2-ethoxyethylamine and 16.5 ml. of triethylamine. The mixture is refluxed for three hours, then cooled and diluted with 100 ml. of water and 100 ml. of ether. The resulted solution is acidified with chilled hydrochloric acid to pH 1 and shaken.

The ether layer is dried over magnesium sulfate, then filtered. The ether is removed in vacuo and the residue is washed with hexane and then crystallized with ether. The solid material is recrystallized from chloroform-hexane to give 2 - chloro - 4 - (2 - ethoxyethylamino) - 5 - sulfamoylbenzonitrile.

A solution of 0.5 g. of 2-chloro-4-(2-ethoxyethylamino)-5-sulfamoylbenzonitrile in 3 ml. of 10% sodium hydroxide solution is heated on a steam bath for two hours. It is then chilled and acidified to pH 1. The white precipitate is collected by filtration and recrystallized from aqueous methanol to give 2-chloro-4-(2-ethoxyethylamino)-5-sulfamoylbenzoic acid.

EXAMPLE 6

A mixture of 5 g. of 2,4-dichloro-5-sulfamoylbenzonitrile (prepared as in Example 1) and 2.5 g. of 2-thenylamine is dissolved in a mixture of 16.5 ml. of the dimethyl ether of diethylene glycol and 16.5 ml. of triethylamine. The mixture is refluxed for three hours, then cooled to room temperature and diluted with 100 ml. of water and 100 ml. of ether. The mixture is acidified to pH 1 with dilute hydrochloric acid, then filtered. The ether layer is dried and the precipitate is filtered off and recrystallized from aqueous methanol to give 2-chloro-4-(2-thenylamino)-5-sulfamoylbenzonitrile.

A mixture of 2-chloro-4-(2-thenylamino)-5-sulfamoylbenzonitrile and 10 ml. of 10% sodium hydroxide solution is heated on a steam bath for two hours, then chilled, acidified to pH 1 and filtered to give 2-chloro-4-(2-thenylamino)-5-sulfamoylbenzoic acid.

EXAMPLE 7

Five grams of 2,4-dichloro-5-sulfamoylbenzonitrile is dissolved in a mixture of 16.5 ml. of the dimethyl ether of diethylene glycol and 16.5 ml. of triethylamine. Benzylamine (2.36 g.) is added and the resulting mixture is refluxed for three hours, then diluted with 100 ml. of water and 100 ml. of ether. The mixture is chilled, then acidified with dilute hydrochloric acid. The precipitate is collected by filtration and recrystallized from aqueous methanol to give 4-benzylamino-2-chloro-5-sulfamoylbenzonitrile.

One gram of the above prepared benzonitrile is heated on a steam bath with 10 ml. of 10% sodium hydroxide solution for two hours. Cooling, acidifying to pH 2 and filtering gives 4-benzylamino-2-chloro-5-sulfamoylbenzoic acid.

Using 4.3 g. of dibenzylamine in place of benzylamine in the above procedure the product is 4-dibenzylamino-2-chloro-5-sulfamoylbenzoic acid.

EXAMPLE 8

To a solution of 5 g. of 2,4-dichloro-5-sulfamoylbenzonitrile (prepared as in Example 1) in 16.5 ml. of the dimethyl ether of diethylene glycol is added 2.16 g. of cyclopentylmethylamine and 16.5 ml. of triethylamine. The mixture is refluxed for three hours, then is cooled and diluted with 100 ml. of water and 100 ml. of ether. The resulting solution is acidified with hydrochloric acid. The organic layer is dried and the ether is removed in vacuo. The residue is chilled and crystallized with toluene. The solid material is recrystallized from aqueous methanol to give 2 - chloro - 4 - cyclopentylmethylamino - 5 - sulfamoylbenzonitrile.

A mixture of 0.5 g. of 2-chloro-4-cyclopentylmethylamino-5-sulfamoylbenzonitrile and 3 ml. of 10% sodium hydroxide solution is heated on a steam bath for three hours, then is cooled, acidified to pH 2 and filtered to give 2 - chloro - 4 - cyclopentylmethylamino - 5 - sulfamoylbenzoic acid.

EXAMPLE 9

A mixture of 6.7 g. of magnesium turnings, a small crystal of iodine, 75 ml. of ether and 3 g. of 2-iodo-5-chlorobenzotrifluoride is heated on a steam bath slowly until the reaction begins and then 81 g. of 2-iodo-5-chlorobenzotrifluoride dissolved in 200 ml. dry ether is added dropwise with stirring to keep the reaction gently refluxing. After the complete addition, the solution is gently heated and stirred until all the magnesium dissolves.

The solution is then slowly poured into crushed Dry Ice with stirring, allowed to stand, then poured into 1 l. of ice water with 27.5 ml. concentrated hydrochloric acid. The ether layer is separated from the aqueous layer. The ether is extracted with 120 ml. of 10% sodium hydroxide solution. The basic extracts are acidified with hydrochloric acid to pH 1. A solid material is collected by filtration and sublimed in vacuo to give 4-chloro-2-trifluoromethylbenzoic acid.

4-chloro-2-trifluoromethylbenzoic acid (4.8 g.) is added with stirring to 31 g. of fuming 30% sulfuric acid. To this mixture is added dropwise 7.7 g. of fuming nitric acid keeping the temperature below 70° C. The mixture is heated with stirring on a steam bath for two hours, then treated with a large excess of ice water and filtered to give 4-chloro-5-nitro-2-trifluoromethylbenzoic acid.

To a mixture of 4.8 g. of iron powder and a solution of 2.5 g. of ammonium chloride in 40 ml. of water at 50° C. is added 4.3 g. of 4-chloro-5-nitro-2-trifluoromethylbenzoic acid. The resulting mixture is heated on a steam bath with stirring for three hours, then treated with 10% sodium carbonate, filtered, neutralized with concentrated hydrochloric acid, allowed to stand, cooled and filtered to give 5-amino-4-chloro-2-trifluoromethylbenzoic acid.

To a suspension of 4.0 g. of 5-amino-4-chloro-2-trifluoromethylbenzoic acid in 10 ml. of concentrated hydrochloric acid at 6° C. is added slowly with stirring a solution of 1.14 g. of sodium nitrite in 60 ml. of water. The resulting cold mixture is poured with stirring into 15 ml. of acetic acid containing 0.2 g. of cuprous chloride. The solid material is filtered off, washed with water and then added with stirring to an excess of ammonium hydroxide. After stirring at room temperature for two hours, the solution is made acid with concentrated hydrochloric acid and the 4-chloro-5-sulfamoyl-2-trifluoromethylbenzoic acid is filtered off, washed with water and dried.

By the procedure of Example 2, using 3 g. of 4-chloro-5-sulfamoyl-2-trifluoromethylbenzoic acid and 2.9 g. of furfurylamine, the product is 4-furfurylamino-5-sulfamoyl-2-trifluoromethylbenzoic acid.

Three grams of thionyl chloride is added to a stirred, refluxing suspension of 2.5 g. of 4-furfurylamino-5-sulfamoyl-2-trifluoromethylbenzoic acid in 15 ml. of dry benzene and 2 drops of pyridine under nitrogen. The mixture is refluxed for 30 minutes, filtered hot and treated with hexane. Cooling and filtering gives 4-furfurylamino-5-sulfamoyl-2-trifluoromethylbenzoyl chloride.

A mixture of 1 g. of the above prepared benzoyl chloride and 100 ml. of absolute methanol is heated on a steam bath for 30 minutes to give, after chilling and filtering, methyl 4-furfurylamino-5-sulfamoyl - 2 - trifluoromethylbenzoate.

In the same manner, using ethanol n-butanol and n-hexanol in place of methanol in the above procedure, the corresponding ethyl, n-butyl and n-hexyl esters, respectively, are obtained.

EXAMPLE 10

A mixture of 16.2 g. of 2,4-difluorobenzoic acid and 58 g. of chlorosulfonic acid is heated to 160° C., then cooled and poured into ice water. Filtering gives 2,4-difluoro-5-chlorosulfonylbenzoic acid. Treating this 5-chlorosulfonyl compound with a cold aqueous methanol solution of methylamine, then concentrating the mixture in vacuo, acidifying with hydrochloric acid and filtering gives 2,4-difluoro-5-methylsulfamoylbenzoic acid.

By the procedure of Example 9, the above prepared benzoic acid is refluxed with methanol containing sulfuric acid to give methyl 2,4-difluoro-5-methylsulfamoylbenzoate. This ester is treated with concentrated ammonium hydroxide and the resulting benzamide is treated with thionyl chloride to give 2,4-difluoro-5-methylsulfamoylbenzonitrile.

To 2.0 g. of 2,4-difluoro-5-methylsulfamoylbenzonitrile in 8 ml. of the dimethyl ether of diethylene glycol is added 1.1 g. of 2-tetrahydrofurylmethylamine and 8.0 ml. of triethylamine. The mixture is refluxed for three hours, then worked up as in Example 1 to give 2-fluoro-4-(2-tetrahydrofurylmethylamino)-5-methylsulfamoylbenzonitrile.

Heating 1 g. of the above prepared benzonitrile with 20 ml. of 10% sodium hydroxide solution on a steam bath for two hours and working up as in Example 1 gives 2-fluoro - 4 - (2 - tetrahydrofurylmethylamino)-5-methylsulfamoylbenzoic acid.

Similarly, using 2,4-difluoro-5-(n-butyl) or (n-hexyl) sulfamoylbenzonitrile (prepared as above using n-butylamine or n-hexylamine in ethanol in place of methylamine), the products are 2-fluoro-4-(2-tetrahydrofurylmethylamino)-5-(n-butyl)sulfamoylbenzoic acid and 2-fluoro-4-(2-tetrahydrofurylmethylamino) - 5 - (n-hexyl)-sulfamoylbenzoic acid, respectively.

EXAMPLE 11

Ten grams of 2,4-dibromo-5-sulfamoylbenzoic acid in 100 ml. of cold methanol is treated with 5 ml. of concentrated sulfuric acid. The resulting mixture is heated at reflux for three hours, then concentrated, cooled and filtered to give methyl 2,4-dibromo-5-sulfamoylbenzoate.

By the procedure of Example 9, the above prepared ester is treated with concentrated ammonium hydroxide and the resulting benzamide is treated with thionyl chloride to give 2,4-dibromo-5-sulfamoylbenzonitrile.

A mixture of 3.4 g. of 2,4-dibromo-5-sulfamoyl-benzonitrile, 1.1 g. of furfurylamine, 10 ml. of triethylamine and 10 ml. of the dimethyl ether of diethylene glycol is heated at reflux for three hours to give, after working up as in Example 1, 2-bromo-4-furfurylamino-5-sulfamoylbenzonitrile.

Heating two grams of the above prepared benzonitrile with 40 ml. of 10% sodium hydroxide solution on a steam bath for two hours and working up as in Example 1 gives 2-bromo-4-furfurylamino-5-sulfamoylbenzoic acid.

Treating a sample of the above prepared benzoic acid with an equimolar amount of potassium hydroxide in water gives, after evaporating the water in vacuo, the potassium salt of 2-bromo-4-furfurylamino-5-sulfamoylbenzoic acid.

EXAMPLE 12

To a solution of 14.6 g. of 2-tetrahydrothiapyrancarboxylic acid in 100 ml. of toluene is added 10.1 g. of triethylamine. To this mixture at —5° C. to —10° C. is added dropwise with stirring 10.9 g. of ethyl chloroformate. After stirring at 0° C. for 30–60 minutes the triethylamine hydrochloride which forms is removed by filtration. To the filtrate is added at 0° C. with stirring a solution of an excess of ammonia in toluene. The resulting toluene solution after standing at 0–30° C. for several hours is washed with water and with a dilute aqueous solution of sodium carbonate. The toluene is removed in vacuo to give 2-tetrahydrothiapyrancarboxylic acid amide.

Lithium aluminum hydride (8.36 g.) is crushed under dry ether and then stirred under reflux with 400 ml. of dry ether for two hours. After cooling to 0° C., a solution of 16.0 g. of 2-tetrahydrothiapyrancarboxylic acid amide in 100 cc. of dry ether is added dropwise with stirring. After completion of the addition, the mixture is refluxed for 30–60 minutes, then cooled to 0° C. Water (8 ml.) is added dropwise with stirring followed by 6 ml. of 6 N sodium hydroxide and then an additional 28 ml. of water. The organic layer is separated and dried over anhydrous sodium sulfate. The sodium sulfate is removed by filtration, the solvent is removed in vacuo and the residue distilled to give 2-tetrahydrothiapyranylmethylamine.

By the procedure of Example 1, 1.4 g. of 2-tetrahydrothiapyranylmethylamine and 8 ml. of triethylamine are added to 2.5 g. of 2,4-dichloro-5-sulfamoylbenzonitrile (prepared as in Example 1) and 8 ml. of the dimethyl ether of diethylene glycol and the resulting mixture is refluxed for two hours and worked up to give 2-chloro-4-(2-tetrahydrothiapyranylmethylamino) - 5-sulfamoylbenzonitrile.

Heating the above prepared benzonitrile with 10% sodium hydroxide solution and working up as in Example 1 gives 2-chloro-4-(2 - tetrahydrothiapyranylmethylamino)-5-sulfamoylbenzoic acid.

By the above procedure, using 14.6 g. of 3-tetrahydrothiapyrancarboxylic acid, the product is 2-chloro-4-(3-tetrahydrothiapyranylmethylamino)-5 - sulfamoylbenzoic acid.

EXAMPLE 13

Using 1 g. of 2-tetrahydrothienylmethylamine in place of 2-tetrahydropyranylmethylamine in the procedure of Example 1, the product is 2-chloro-4-(2-tetrahydrothienylmethylamino) - 5-sulfamoylbenzoic acid.

EXAMPLE 14

A mixture of 20 g. of 3-tetrahydropyrancarboxylic acid, 100 ml. of methanol and 5 ml. of concentrated sulfuric acid is refluxed for two hours, then cooled and filtered to give methyl 3-tetrahydropyrancarboxylate.

To 100 ml. of a saturated solution of ammonia in methanol is added 14.4 g. of methyl 3-tetrahydropyrancarboxylate. The remaining solution is kept at room temperature for three days. Removal of the solvent and excess ammonia in vacuo gives 3-tetrahydropyrancarboxylic acid amide.

The above prepared 3-tetrahydropyrancarboxylic acid amide is reduced by the procedure of Example 12 using lithium aluminum hydride in dry ether to give 3-tetrahydropyranylmethylamine.

Reacting 1 g. of 3-tetrahydropyranylmethylamine with 2 g. of 2,4-dichloro-5-sulfamoylbenzonitrile by the procedure of Example 1 and heating the resulting 2-chloro-4-(3 - tetrahydropyranylmethylamino) - 5 - sulfamoylbenzonitrile with 10% sodium hydroxide solution on a steam bath and working up as in Example 1 gives 2-chloro-4-(3-tetrahydropyranylmethylamino) - 5-sulfamoylbenzoic acid.

EXAMPLE 15

To a solution of 8.36 g. of lithium aluminum hydride in 125 ml. of tetrahydrofuran at 0–5° C. is added dropwise with stirring a solution of 11.1 g. of 3-furancarboxylic acid amide. After heating at 60° C. with stirring for 45 minutes, the mixture is cooled at 0° C. The following are added successively and dropwise with stirring and cooling: 8 ml. of water, 6 ml. of 6 N sodium hydroxide and 28 ml. of water. The tetrahydrofuran solution is decanted and dried over anhydrous sodium sulfate. The sodium sulfate is removed by filtration and the solvent is removed in vacuo and the residue is distilled to give 3-furylmethylamine.

To a solution of 30 g. of 3-furylmethylamine in 150 ml. of dioxane is added 9 g. of Raney nickel. This mixture is hydrogenated at 1000–3000 p.s.i. and 120–180° C. for two hours. After filtering off the catalyst, removing the solvent in vacuo and distilling the residue in vacuo 3-tetrahydrofurylmethylamine is obtained.

By the procedure of Example 1, using 1.1 g. of 3-tetrahydrofurylmethylamine and 2.5 g. of 2,4-dichloro-5-sulfamoylbenzonitrile, the product is 2-chloro-4-(3-tetrahydrofurylmethylamino) - 5-sulfamoylbenzoic acid.

EXAMPLE 16

To a mixture of 5 g. of 3-thiophenecarboxaldehyde oxime, 40 ml. of water and 30 ml. of 95% ethanol is added gradually with stirring at a temperature of 80° C. 2300 g. of 2.5% sodium-mercury amalgam and from time to time sufficient water to keep the mixture fluid (total amount of water is 1200 ml.). After standing for 24 hours, volatile material is distilled off. The distillate is neutralized with hydrochloric acid and concentrated in vacuo to a small volume. Excess potassium hydroxide is added and the mixture is extracted with ether. The extracts are concentrated and distilled to give 3-tetrahydrothienylmethylamine.

By the procedure of Example 1, using 1.4 g. of 3-tetrahydrothienylmethylamine and 2.5 g. of 2,4-dichloro-5-sulfamoylbenzonitrile, the product is 2-chloro-4-(3-tetrahydrothienylmethylamino) - 5-sulfamoylbenzoic acid.

EXAMPLE 17

2,4-dichloro-5-chlorosulfamoylbenzoic acid (28.8 g.) and 5 g. of methoxyamine are stirred for one hour. The mixture is then acidified and filtered to give 2,4-dichloro-5-methoxysulfamoylbenzoic acid.

By the procedure of Example 9, the above prepared benzoic acid is converted to the corresponding benzonitrile.

A mixture of 2.8 g. of 2,4-dichloro-5-methoxysulfamoylbenzonitrile, 1.1 g. of furfurylamine, 8 ml. of triethylamine and 8 ml. of the dimethyl ether of diethylene glycol is heated at reflux for three hours and worked up as in Example 1 to give 2 - chloro - 5 - furfurylamino-5-methoxysulfamoylbenzonitrile.

Two grams of the above prepared benzonitrile is heated with 40 ml. of 10% sodium hydroxide solution. Working up as in Example 1 gives 2-chloro-4-furfurylamino-5-methoxysulfamoylbenzoic acid.

Using 10 g. of butoxyamine in place of methoxyamine in the above procedure gives 5-butoxysulfamoyl-2-chloro-4-furfurylaminobenzoic acid.

EXAMPLE 18

By the procedure of Example 1, the following amines are reacted with 2,4-dichloro-4-dichloro-5-sulfamoylbenzonitrile:
    3-cyclohexene-1-methylamine
    2-cyclohexene-1-methylamine
    5-norbornene-2-methylamine
to give:

2 - chloro - 4 - [1 - (3 - cyclohexenyl)methylamino] - 5-sulfamoylbenzoic acid

2 - chloro - 4 - [1 - (2 - cyclohexenyl)methylamino] - 5-sulfamoylbenzoic acid and 2 - chloro - 4 - [2 - (5 - norbornenyl)methylamino] - 5-sulfamoylbenzoic acid, respectively.

What is claimed is:

1. A compound of the formula:

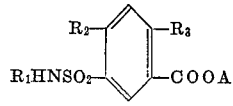

in which:

A is hydrogen, lower alkyl or lower alkoxy-lower alkylene;

$R_1$ is hydrogen or lower alkoxy;

$R_2$ is cyclopentylmethylamino, cyclohexenylmethylamino, 5-norbornenylmethylamino, 2-(3,4-dihydro-2H-pyranyl)-methylamino, tetrahydrothienylmethylamino, tetrahydropyranylmethylamino, tetrahydrothiapyranylmethylamino or lower alkoxy-lower alkyleneamino and $R_3$ is chloro, bromo or trifluoromethyl or, when A is hydrogen, a carboxylic acid salt thereof.

2. A compound according to claim 1 in which A and $R_1$ are hydrogen, $R_2$ is 2-tetrahydropyranylmethylamino and $R_3$ is chloro.

3. A compound of the formula:

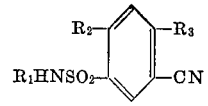

in which:
 $R_1$ is hydrogen, lower alkyl or lower alkoxy;
 $R_2$ is furylmethylamino, thenylamino, benzylamino, dibenzylamino, cyclopentylmethylamino, cyclohexenylmethylamino, 5 - norbornenylmethylamino, 2,3,4 - dihydro - 2H - pyranyl)methylamino, tetrahydromethylamino, tetrahydrothienylmethylamino, tetrahydropyranylmethylamino, tetrahydrothiapyranylmethylamino or lower alkoxy-lower alkyleneamino and
 $R_3$ is chloro, bromo or fluoro.

4. A process of preparing a compound of the formula:

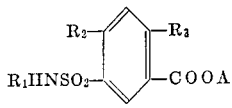

in which:
 A is hydrogen;
 $R_1$ is hydrogen, lower alkyl or lower alkoxy;
 $R_2$ is furylmethylamino, thenylamino, benzylamino, dibenzylamino, cyclopentylmethylamino, cyclohexenlymethylamino, 5-norbornenylmethylamino, 2-(3,4-dihydro-2H-pyranyl) - methylamino, tetrahydrofurylmethylamino, tetrahydrothienylmethylamino, tetrahydropyranylmethylamino, tetrahydrothiapyranylmethylamino or lower alkoxy-lower alkyleneamino and
 $R_3$ is chloro, bromo or fluoro which comprises reacting a benzoic acid ester of the formula:

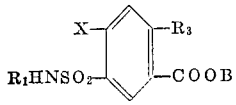

in which $R_1$ and $R_3$ are as defined above; B is lower alkyl and X is chloro, bromo or fluoro chosen so that when $R_3$ is chloro, X is chloro or fluoro, when $R_3$ is bromo, X is chloro, bromo or fluoro and when $R_3$ is fluoro, X is fluoro, with ammonium hydroxide to give the benzamide of the formula:

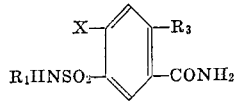

in which $R_1$, $R_3$ and X are as defined above; reacting said benzamide with thionyl chloride to give a benzonitrile of the formula:

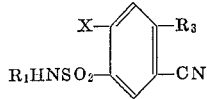

in which $R_1$, $R_3$ and X are as defined above; reacting said benzonitrile with $R_2H$ in which $R_2$ is as defined above to give a compound of the formula:

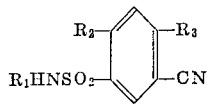

in which $R_1$, $R_2$ and $R_3$ are as defined above; and reacting said 4-substituted aminobenzonitrile with aqueous sodium hydroxide solution.

References Cited

FOREIGN PATENTS
936,417  9/1963  Great Britain.

OTHER REFERENCES
Karrer Organic Chem. Elsevier, New York (1938), page 168.
Sturm et al. Chem. Berichte, vol. 99(1), January 1966, page 330.
Siedel et al. Chem. Berichte, vol. 99(1), January 1966, page 346.
Siedel et al. Chem. Berichte, vol. 99(1), page 350, Jan. 3, 1966.
Sturm et al. Chem. Berichte, vol. 99(1), January 1966, page 328.
Siedel et al. Chem. Berichte, vol. 99(1), January 1966, page 345.

JAMES A. PATTEN, Primary Examiner

U.S. Cl. X.R.

260—465, 519, 345.1, 518, 470, 332.2, 999, 556, 515, 345.7, 345.8, 347.2, 347.7, 329, 332.5